(No Model.) 3 Sheets—Sheet 1.
G. B. RICHMOND.
DENTAL PELLET MACHINE.
No. 525,798. Patented Sept. 11, 1894.
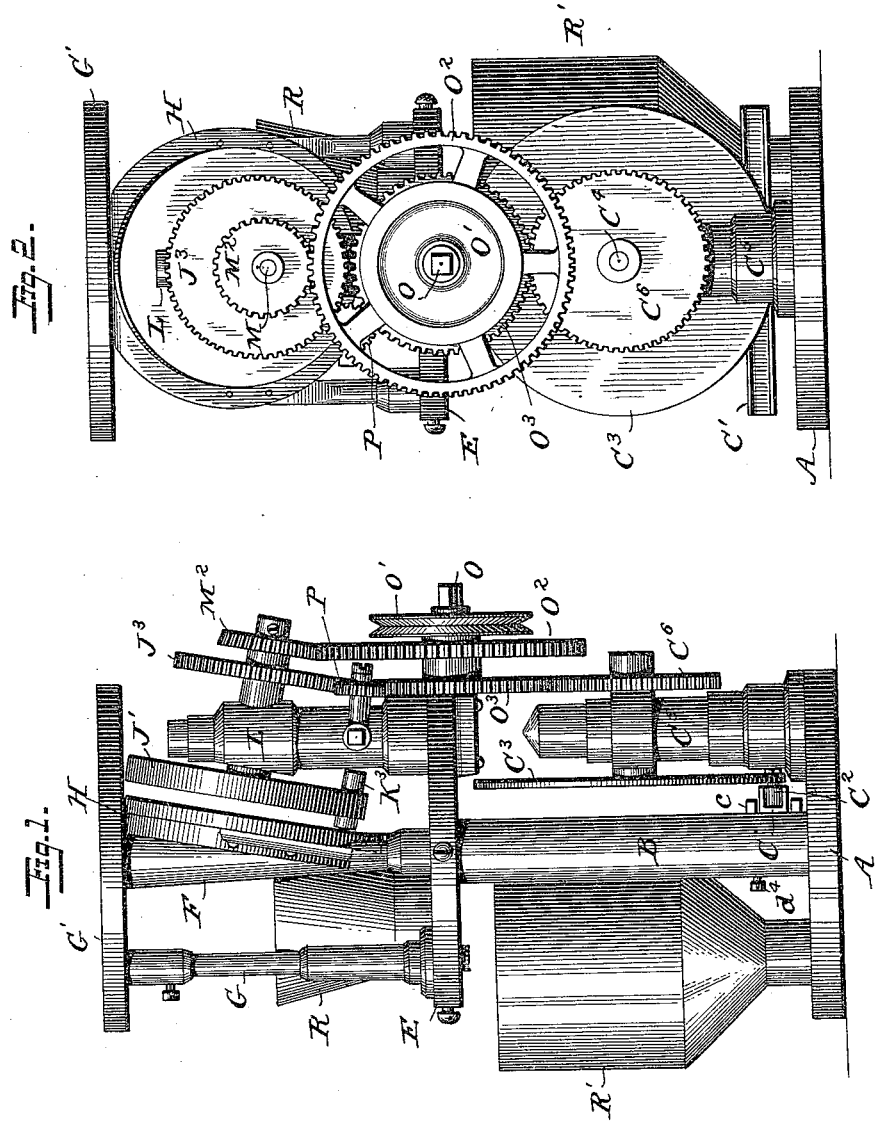
Witnesses
Jno. G. Hinkel
Allie N. Dobson
Inventor
G. B. Richmond.
Foster Freeman
Attorneys (No Model.) 3 Sheets—Sheet 2.
G. B. RICHMOND.
DENTAL PELLET MACHINE.
No. 525,798. Patented Sept. 11, 1894.
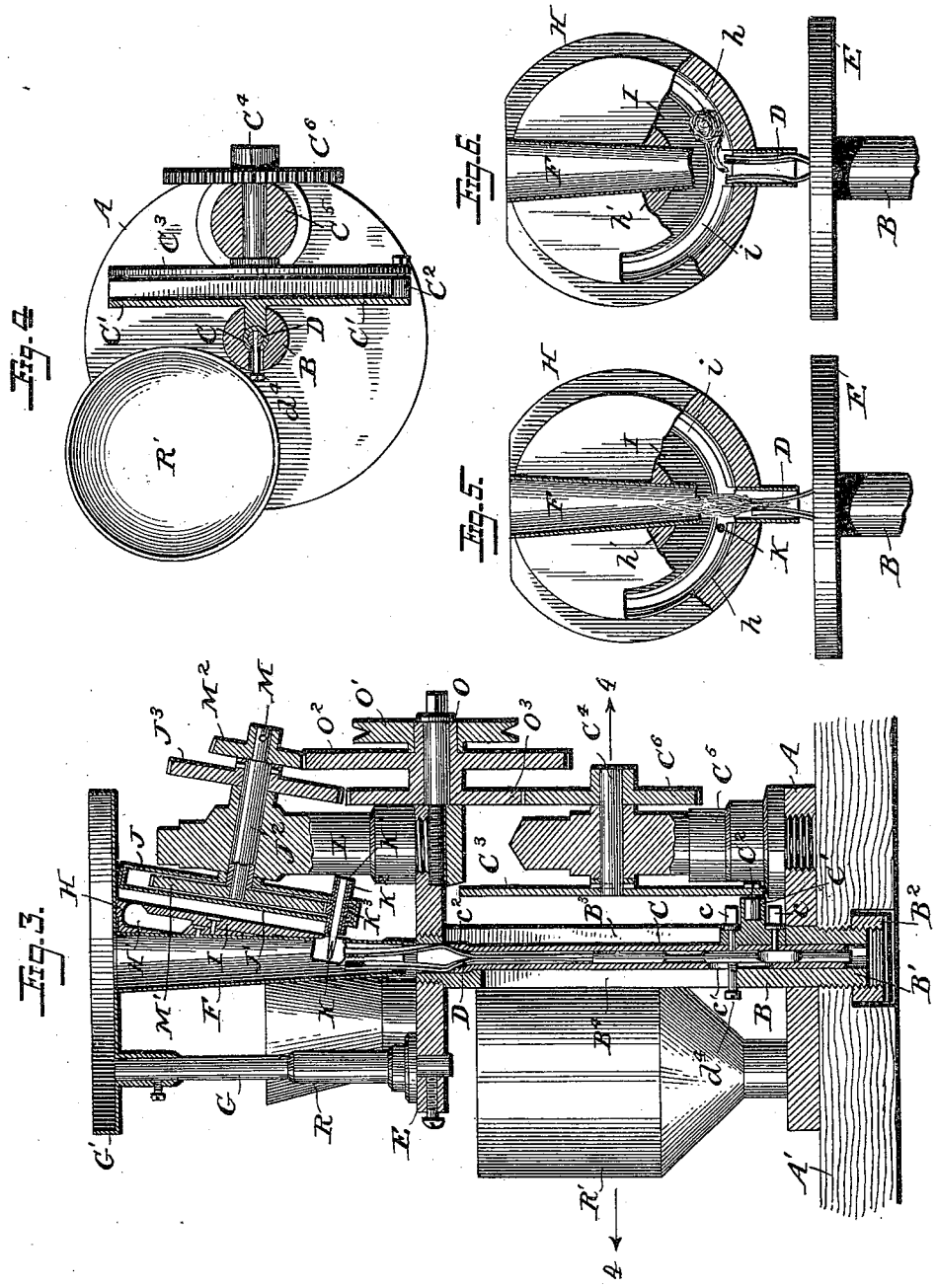
Witnesses
Jno. G. Hinkel
Alex N. Dobson
Inventor
G. B. Richmond
by Fowler Freeman
Attorneys (No Model.)　　　　　　　　　　　　　　　　　　3 Sheets—Sheet 3.
G. B. RICHMOND.
DENTAL PELLET MACHINE.
No. 525,798.　　　　　　　　　　Patented Sept. 11, 1894.
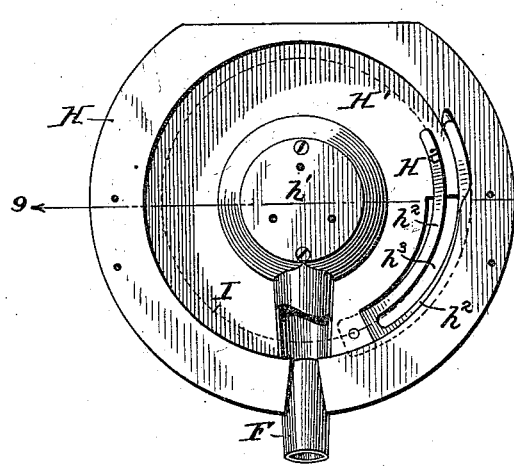
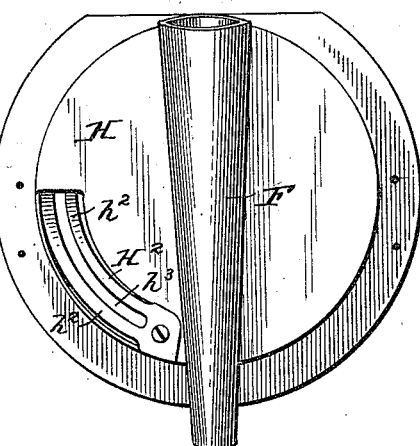
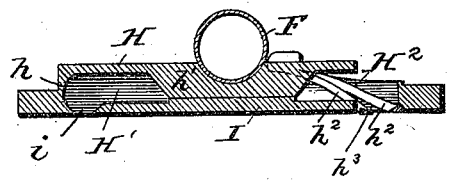
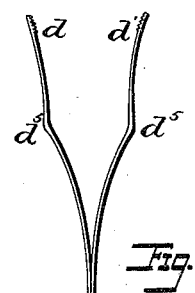
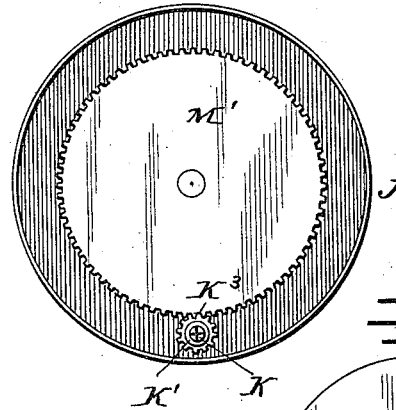
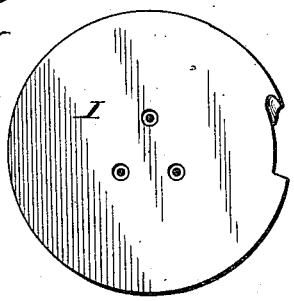
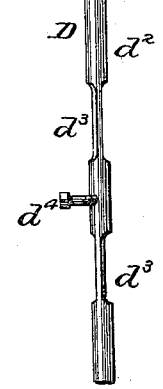
Witnesses　　　　　　　　　　　　　　　Inventor
　　　　　　　　　　　　　　　　　　　　G. B. Richmond
　　　　　　　　　　　　　　　　　　　　Attorneys

UNITED STATES PATENT OFFICE.

GEORGE B. RICHMOND, OF LANSING, MICHIGAN.

DENTAL-PELLET MACHINE.

SPECIFICATION forming part of Letters Patent No. 525,798, dated September 11, 1894.

Application filed September 15, 1893. Serial No. 485,609. (No model.)

*To all whom it may concern:*

Be it known that I, GEORGE B. RICHMOND, a citizen of the United States, residing at Lansing, Ingham county, State of Michigan, have invented certain new and useful Improvements in Dental-Pellet Machines, of which the following is a specification.

My invention relates to dental pellet machines, and it has for its object to provide a machine which shall be simple, cheap and effective, and which shall be capable of producing improved dental pellets rapidly and perfectly, and to these ends my invention consists in a machine embodying the features of construction and arrangement, and having the mode of operation substantially as hereinafter more particularly pointed out.

Referring to the accompanying drawings, Figure 1, is a side elevation of a machine embodying the invention. Fig. 2, is a rear elevation of the same. Fig. 3, is a longitudinal, vertical section of Fig. 1. Fig. 4, is a horizontal transverse section on the line 4—4, Fig. 3. Figs. 5 and 6 are detail cross-sectional views of the parts, showing the features of the operation of forming a pellet. Figs. 7 and 8 are front and rear views of the face-plate. Fig. 9, is a horizontal, transverse section of the plate on line 9, Fig. 7. Fig. 10 is a plan view of the gear case. Fig. 11, is a detail plan view of the guide-plate. Fig. 12, is a detail elevation of the pliers; and Fig. 13, is a plan view of the spindle or spinning needle.

In the practice of dentistry, every dentist is in the habit and of necessity is constantly using small pellets or balls of some absorbent material, usually of absorbent cotton, with which to wipe out and dry the cavities of the teeth, and for various other uses in the ordinary practice of the art. These balls or pellets are now usually prepared by hand, by drawing from a mass of cotton or other material small amounts which are pressed or formed into small wads or masses between the fingers of the operator, and are placed in convenient position for ready use in the ordinary operations. These wads or masses are necessarily of irregular shape, are more or less compressed, and are not of a uniform or desirable consistency, and it is exceedingly difficult and almost impracticable to make them satisfactorily by this method. More than that, they are unavoidably more or less tainted or soiled from the perspiration of the hand, or other uncleanliness, notwithstanding the great care that is taken in preparing them, as they are highly absorbent and are exceedingly delicate and subject to impurities. In order to avoid these objections, it has been proposed to use forceps with which to grasp the mass or wad of cotton or other material, and to brush the fibers around the point of the forceps by mechanical means, and while this avoids some of the objections to the old hand process, it is slow and tedious, each mass being formed as it is used, on the forceps, and when used removed from the forceps and thrown away, when another one can be made in its place, but this does not produce a mass of uniform consistency in which the fibers are properly distributed and formed into a desirable pellet.

It is the object of my invention to provide a machine which shall make an improved pellet, in which the fiber is uniformly wound or spun about the center, so that the body of the pellet shall be of a proper consistency and density, and in such a shape or form that it will be in the most satisfactory condition for uses for all purposes in connection with the art, and to be enabled thereby to supply the profession with pellets in quantity, at reasonable rates and in such a condition that they are perfectly clean and best adapted for immediate use, with gratification both to the patient and the operator, and I will now proceed to describe the embodiment of my invention as shown in the accompanying drawings, it being understood that while I have shown an organized machine for accomplishing the purpose, which has proved satisfactory, the details of construction and arrangement may be varied, and parts may be used in combination with each other or in combination with other equivalent devices for accomplishing substantially the same results, without departing from the spirit of my invention.

The machine is adapted generally to withdraw from a mass or body of material, as for instance absorbent cotton, a certain amount thereof sufficient to constitute a pellet of the desired size. Mechanism is provided whereby this material is formed into what I term a fillet being drawn out or elongated and separated from the mass or body of material. Then it is brought into the path of a rotating spindle or spinning needle with which it engages, and being released from the drawing mechanism, it is wound or spun into the desired form and automatically discharged into a proper receptacle. While this is a general outline of the operation to be performed by the machine, and while it is evident that various detailed devices may be used, the mechanism shown in the drawings discloses a complete, organized machine for this purpose.

Upon a suitable base A, is mounted a standard B, and the mechanism is supported on the base and standard, and as shown in the drawings, the whole is mounted on a table, bench or platform A', which has preferably a recess to receive the projecting end B' of the standard, and in the present instance I have shown the end of the standard as screw-threaded and provided with a nut $B^2$, which serves to secure the base A to the board or plate A', and aids in maintaining the desired rigidity of the machine. This standard B is hollow, and reciprocating in the standard is a hollow shaft C, and this may be operated in any desired manner, it being shown as provided with a U-shaped, slotted cross-bar C', which is secured thereto by suitable screws or bolts $c$, or otherwise, and taking into this slotted bar is a pin $C^2$, preferably provided with a friction roller, which pin is mounted on an arm or wheel $C^3$, secured on the axle $C^4$, which is supported in the standard or bearing $C^5$, secured to the base of the machine. Also mounted on the axle or shaft $C^4$ is a gear-wheel $C^6$, which is connected to be driven from the source of power, in the manner hereinafter described. It will be noticed that the standard B is provided with a longitudinal, vertical slot $B^3$, extending practically throughout its entire length, and is also provided with a longitudinal, vertical slot $B^4$ in its front side, of somewhat lesser length. It will further be noticed that the shaft C is also slotted, as at $c'$, preferably at or near its lower portion.

Mounted on the hollow shaft C are the pliers or grippers D, shown in detail in Fig. 12, and these pliers consist of the gripping points or arms $d$, $d'$, which are made of spring material, such as steel, and have their ends roughened, and which are secured by solder or otherwise in the body or stem $d^2$. These pliers or the stem $d^2$ carrying the pliers are made to fit the hollow shaft C somewhat closely, so that it will be moved by friction with the reciprocating shaft, and while various means may be used to accomplish this purpose, I have shown the shaft $d^2$, as cut away at $d^3$, so that it can be bent or sprung slightly out of the true line, thereby furnishing the desired frictional contact with the hollow shaft C. Secured to the stem $d^2$ is a pin or screw $d^4$, which controls the movement of the pliers in relation to the reciprocating hollow shaft, and it will be seen by reference to Fig. 4, that this screw $d^4$ passes through the slot $c'$ in the hollow shaft, and contacts with the extremities of the slot $B^4$ in the standard B. By this arrangement, it will be seen that throughout the greater portion of its reciprocation the pliers travel with the reciprocating hollow shaft C, but as the shaft reaches its uppermost position, the pin $d^4$ impinges upon the upper end of the slot $B^4$, and stops the further motion of the pliers, and likewise, when the shaft is brought downward, the pin $d^4$, as shown in the drawings, impinges upon the lowermost extremity of the slot $B^4$, and stops the further downward movement of the pliers. It will be noticed that the pliers are shown as having projections or shoulders $d^5$, and these serve as bearing points for opening and closing the pliers in their ordinary operations. In order to cause these to be opened and closed at the proper times, these projections are brought in contact with the end $c^2$ of the hollow shaft C, and this end is preferably formed as best shown in Fig. 3, although it is not absolutely necessary to so form them, and it will be seen that it is slightly enlarged and the inner edge of the opening is tapered, so as to form a more accurate and easy bearing on the projections of the pliers. It will be observed that when the pliers are forced into the hollow shaft C, they are closed by the projections $d^5$ coming in contact with the end $c^2$ of the shaft, and when they are moved outward from the hollow shaft, they spring open by their own resiliencey. As before stated, the shaft C is reciprocated in the standard by suitable means, so that as it is raised upward it carries the pliers with it until the pin $d^4$ impinges upon the upper extremity of the slot $B^4$, which stops the further upward movement of the pliers, while the hollow shaft passing farther upward, its end bears on the projections $d^5$, closing the pliers and grasping the material which is supplied thereto in the manner hereinafter set forth. The hollow shaft then descends, carrying with it the pliers holding the material, until the pin $d^4$ reaches the lowermost portion of the slot $B^4$, when the motion of the pliers is arrested and the hollow shaft passing on farther, allows the pliers to spring open to release the material grasped thereby. The extent of this opening of the pliers in the present instance is limited by the interior sides of the hollow standard B.

Mounted on the standard B is a platform E, and supported on the standard are the means for forming the fillet or filaments, carried by the grippers, into the pellets. Arranged above the pliers and embracing them is a tube F, preferably tapering, through which the pliers and the reciprocating hollow shaft C pass, and mounted on a suitable standard G is a plate or support G' for the material, shown in the present instance as a flanged plate adjustably secured in the standard and having an opening corresponding to the upper end of the tube F. Various means may be adopted for supporting this tube, but I preferably form it as a part of what I term the "face plate" H. This face plate is best shown in Figs. 7, 8, 9 and 11, and it consists essentially of a plate having a recessed face H', the outer portion of the recess being preferably curved, as shown at $h$, while the central portion $h'$ is beveled and projects inward into the recess. Mounted on this central portion is a guide-plate I, which partially closes the recess H' leaving an open passage or annular channel $i$, for the passage of the spindle or spinning needle. Mounted on or secured to one side of this channel $i$ and in the recess H', is an inclined plane $H^2$, having two arms $h^2$, $h^2$, with an intervening slot $h^3$ between them, and these are arranged at an angle crossing the recess H', and operate to strip off the pellet from the spindle or spinning needle and discharge it in the manner hereinafter described. It will be seen that the face-plate H is arranged at an angle to the tube F, so that the recess H' crosses or is coincident with the tubular passage at one portion of its circumference, the tube being cut away at this point so as to allow the free passage of the spinning needle.

Arranged parallel to the rear face of the face-plate is a gear-case J, preferably provided with a cover J', and mounted in the case is a spindle or spinning needle K, it being supported and held in openings in the gear-case J and its cover J', and in the present instance, I mount the spindle K in a hollow sleeve K', which is mounted in bearings $K^2$ secured in the gear-case J and its cover J'. The spindle is held in its sleeve by frictional contact, or otherwise, so that it is adjustable therein, while the sleeve rotates freely in the bearings $K^2$. Various means may be used for giving a rotary motion to the spindle, as well as a motion of translation through the channel $i$, and I have shown means for rotating the case J, as well as for revolving the needle on its axis. Thus, mounted in a standard L secured to the plate E, is a hollow shaft $J^2$, and this is secured to the case J, and connected to the hollow shaft $J^2$ is a gear-wheel $J^3$, which is driven by suitable means. Extending through the hollow shaft $J^2$ is a shaft M carrying a gear-wheel M' arranged within the gear-case, and this gear-wheel meshes with a pinion $K^3$ mounted on the sleeve K' of the needle. Also mounted on the shaft M is a gear-wheel $M^2$, which is also driven by suitable means. By these devices it will be seen that the case J is rotated, causing the spindle to be given a motion of translation around the axis of the case in the channel $i$, while the spindle or needle rotates on its own axis, being rotated by the gear M' and pinion $k^3$ within the axis. It will be seen that the shafts $J^2$ and M are arranged at an angle to the plate E, and the gears connecting them with the driving mechanism have been correspondingly beveled. The driving mechanism consists in the present instance of a shaft O, which is operated by a crank or pulley O', driven by any suitable power, and mounted on the shaft are the gears $O^2$, $O^3$, they being shown as being made integral with the hub by which they are secured to the drive-wheel $O^2$.

It is desirable, in order to get the highest speed of rotation of the needle, that the gear M' should rotate in one direction, and the case J in the opposite direction, and in order to do this in the present instance I connect the beveled pinion $M^2$ directly with the driving gear $O^2$, and in order to rotate the gear-wheel M' in the opposite direction I interpose an idle pinion P, which meshes with the gear-wheel $J^3$ on hollow shaft $J^2$, and the gear-wheel $O^3$ connected to the driving-wheel, and it will be understood from this construction and arrangement of parts that the gear M' will rotate in one direction, while the case J rotates in the opposite direction, and the spindle or needle K will be caused to move around the shaft of the case, and to rotate on its axis at the same time, and as before stated, owing to the rotation of the gear and case in opposite directions, a greater speed of rotation is transmitted to the spindle.

The spindle or spinning needle, which is shown in detail in Fig. 13, in the preferred form, consists of a body having preferably four slots or recesses in its end, it being tapered so as to leave four points, and while this is the preferred construction, the needle may be otherwise made, but I deem it of importance to have it tapering substantially as shown and provided with a number of teeth, as by this construction I find that it more readily catches the material, and causes it to be wound or spun thereon to form the pellet.

The machine is preferably provided with a receptacle R, arranged on the platform E, and this is also preferably open at the bottom to discharge into a larger receptacle R' mounted on the base A, but it is evident that neither or both of these are material, they only forming convenient receptacles to receive the completed pellets as they are discharged from the machine.

With this general construction of the machine, the operation may be described as follows: The mass of absorbent cotton or other material in any desired form is arranged above the end of the tube F and may be on the support G'. On rotating the drive-wheel, the hollow shaft C and the pliers are raised upward together, until the stop $d^4$ reaches the upward limit of the slot $B^4$, when the pliers are in a position to properly grasp the material, they being open, as shown in Fig. 12. The further movement of the hollow shaft C, however, impinging upon the projections $d^5$, closes the pliers, grasping a portion of the material. The hollow shaft C is then caused to descend, and with it the pliers, and these draw from the mass a sufficient quantity of material to form the pellet, and it will be seen that this material is drawn out in the form of a longitudinal or elongated filament or fillet, and passing through the tube F, is maintained in this condition until the pliers reach the point of their lowermost movement, which is controlled by the pin $d^4$ impinging on the lowermost portion of the slot $B^4$, while the hollow shaft descends farther releasing the pliers, and allowing them to open to let go of the fillet, the extent of the movement being controlled in the present instance by the sides of the hollow standard B. Meanwhile, the spindle or needle has been rotating on its axis and traveling in its path through the channel $i$, and has arrived practically at the position shown in Fig. 5, when it will be seen that it crosses the path of the pliers, impinging upon the fillet, withdrawing it from the position in which it was released and carrying it through the recess H'. The spindle being rotated catches the fibers of the material and the end or ends of the filament being bent over or around the needle by passing through the opening in the tube, and by bearing on the surface $h$ of the recess, it is caused to be wound or spun upon the needle, substantially as indicated in Fig. 6, and in the farther progress through the channel $i$, this winding or spinning is completed until the perfected pellet is made, and at this time it arrives at the open space between the arms $h^2$ of the inclined plane or discharger $H^2$, and these gradually raise and remove the completed pellet from the needle, discharging it through the opening in the front of the face plate, into a suitable receptacle. Meanwhile, the pliers have been raised, opened and closed again to grasp another supply of the material to form a second filament, and these operations are repeated with great rapidity, accuracy, and nicety. It will be seen that owing to the peculiar shape of the recess H', the fibers are caused to wind around or spin upon the needle smoothly and accurately and to form a fillet of the proper and desired conformation and density, and when the pellet is discharged, it has a hollow center, conforming to the space occupied by the needle. It will be observed that by arranging the face-plate at an angle to the tube, the needle is caused to pass through the path of the filament as it is being carried downward by the grippers. In this way, I avoid any transfer of the material laterally from the grippers to the needle, and greatly simplify the construction and arrangement of the machine, and at the same time permit the continuous operation of the vertically reciprocating shaft C, the path of which and the path of the needle coincide at only one point. It will also be observed that the flat ends of the pliers are shown at a slight angle to the plane of the face-plate, and as the fillet is drawn downward, it is somewhat flattened and stands at a slight angle to the axis of the needle, and this I find a refinement of adjustment, as the needle more readily engages the fibers of the fillet and winds or spins them to form the pellet.

I have used the term "spinning" in the above specification, to describe the operation of my machine, in its broad sense, in which it includes a rapid revolving or winding motion, and not in its more specific sense, as applied to spinning threads, which includes the twisting of the thread.

It will be observed that in the operation of my invention, the fibers are formed into an elongated fillet, and this fillet is bent and spun, or if you please, wound spirally around the needle, and this is one of the distinguishing characteristics of my invention, and distinguishes the article made from a mass or wad of fibers, compressed in the ordinary way.

What I claim is—

1. In a dental pellet machine, the combination with means for forming a fillet, of devices operating in connection therewith for spinning or winding said fillet to form the pellet, substantially as described.

2. In a dental pellet machine, the combination with means for drawing the fiber to form a fillet, of devices for spinning or winding the fiber to form the pellet, and means to move said devices across the path of the fillet, substantially as described.

3. In a dental pellet machine, the combination with means for forming the fillet, of a rotating needle and means to move the same across the path of the fillet, substantially as described.

4. In a dental pellet machine, the combination with means for forming the fillet, of a rotating needle, means to move the same across the path of the fillet, and a support provided with a channel through which the needle travels, substantially as described.

5. In a dental pellet machine, the combination with means for forming the fillet, of a rotating needle, means to move the same across the path of the fillet, a support having a channel through which the needle passes, and means for discharging the pellet from the needle, substantially as described.

6. In a dental pellet machine, the combination with a reciprocating fillet forming device, of a rotating needle for forming the pellet, and means to move the same across the path of the reciprocating fillet forming device, substantially as described.

7. In a dental pellet machine, the combination with a reciprocating fillet forming device, and a tube through which the said device passes, of a rotating needle, means to move the same across the path of the fillet forming device the said needle being arranged at an incline to said path, substantially as described.

8. In a dental pellet machine, the combination with the reciprocating pliers, arranged to grasp the material and form a fillet and to release the same, of a rotating needle, means to move the same across the path of the fillet, and means for winding or spinning the fillet upon the needle, substantially as described.

9. In a dental pellet machine, the combination with a support for the material and a tube through which the material passes, of pliers reciprocating in said tube and arranged to grasp a portion of the material and form a fillet, and means for opening and closing the pliers automatically, substantially as described.

10. In a dental pellet machine, the combination with a support for the material and a tube connected therewith through which the material passes, of a reciprocating, hollow shaft, pliers carried thereby and arranged to move in the tube, and means for controlling the movement of the pliers with relation to the shaft, substantially as described.

11. In a dental pellet machine, the combination with the hollow standard having vertical slots therein, of a reciprocating hollow shaft within the standard, pliers mounted in the shaft and means for controlling the movement of the pliers with relation to the shaft, substantially as described.

12. In a dental pellet machine, the combination with the hollow standard having vertical slots therein, of a hollow reciprocating shaft in the standard, means for reciprocating the shaft, pliers mounted in the shaft, and a pin for controlling the movement of the pliers with relation to the shaft, substantially as described.

13. In a dental pellet machine, the combination with the hollow standard, a reciprocating hollow shaft therein pliers mounted in said shaft, a tube arranged above the standard into which the hollow shaft moves, and means for opening and closing the pliers at different positions in said tube, substantially as described.

14. In a dental pellet machine, the combination with the hollow reciprocating shaft and pliers carried thereby to form the fillet a tube into which the shaft moves, means for opening and closing the pliers at different points in the tube, the tube being cut away adjacent to the point of opening the pliers, and means to withdraw the fillet through said cut-away portion substantially as described.

15. In a dental pellet machine, the combination with the reciprocating shaft and pliers, a tube into which the shaft moves, the tube being cut away and a needle arranged to travel through the cut-away portion of the tube, substantially as described.

16. In a dental pellet machine, the combination with the fillet forming mechanism, of a face plate provided with a recess and arranged adjacent the fillet forming mechanism, and a needle arranged to travel through said recess and cross the path of the fillet forming mechanism, substantially as described.

17. In a dental pellet machine, the combination with the fillet forming mechanism, of a face plate provided with a channel and recess, of a rotating needle projecting through said channel into the recess and means to move the same across the path of the fillet forming mechanism, substantially as described.

18. In a dental pellet machine, the combination with the fillet forming mechanism, of a face plate having a channel and recess, the channel coinciding with the path of the fillet forming mechanism at one point, and a rotating needle arranged to travel through the channel into the recess and to cross the path of the fillet forming mechanism, substantially as described.

19. In a dental pellet machine, the combination with the case containing a needle, a hollow shaft connected to the case and means for rotating it, a gear mounted in the case and a shaft connected to the gear and arranged to rotate it in a direction opposite to the rotation of the case, substantially as described.

20. In a dental pellet machine, the combination with the fillet forming mechanism, of a face plate having a recess coinciding with the path of the fillet, a case provided with a needle, means for rotating said needle and for spinning the fillet thereon, and means for discharging the completed pellet from the needle, substantially as described.

21. In a dental pellet machine, the combination with the face plate, having a recess, of a needle upon which the fillet is spun, and a surface inclined to the path of the needle arranged to withdraw the pellet from the needle, substantially as described.

22. In a dental pellet machine, the combination with a face plate provided with a recess, the said recess having a curved outer periphery, of a needle, and means to give it a motion of translation in said recess, substantially as described.

23. In a dental pellet machine, the combination with the face plate having a recess, and a guide plate secured thereto forming a channel communicating with said recess, of a rotating needle extending through the channel into the recess, substantially as described.

24. In a dental pellet machine, the combination with the reciprocating pliers arranged to grasp the material and form a fillet, of a face plate having a recess crossing the path of the fillet, a channel in the face plate communicating with said face plate, a rotating needle passing through the channel and extending into the recess and means for withdrawing the pellet from the needle and discharging it from the recess, substantially as described.

25. In a dental pellet machine, the combination with the reciprocating hollow shaft, of the pliers mounted therein, means for controlling the movement of said pliers with relation to the shaft, the pliers being formed with projections and the end of the shaft being tapered to operate in connection with said projections for opening and closing the pliers, substantially as described.

In testimony whereof I have signed my name to this specification in the presence of two subscribing witnesses.

GEORGE B. RICHMOND.

Witnesses:
F. L. FREEMAN,
ALLE N. DOBSON.